United States Patent
Kim et al.

(10) Patent No.: US 8,423,076 B2
(45) Date of Patent: Apr. 16, 2013

(54) USER INTERFACE FOR A MOBILE DEVICE

(75) Inventors: Joo Min Kim, Seoul (KR); Youk Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 785 days.

(21) Appl. No.: 12/196,162

(22) Filed: Aug. 21, 2008

(65) Prior Publication Data

US 2009/0197635 A1 Aug. 6, 2009

Related U.S. Application Data

(60) Provisional application No. 61/025,318, filed on Feb. 1, 2008.

(30) Foreign Application Priority Data

Apr. 28, 2008 (KR) .................. 10-2008-0039307
Jul. 15, 2008 (KR) .................. 10-2008-0068752

(51) Int. Cl.
*H04M 1/00* (2006.01)

(52) U.S. Cl.
USPC ........ 455/550.1; 455/457; 455/416; 455/417; 715/863; 715/864; 715/865; 715/866; 345/156; 345/157; 345/158; 345/166; 345/169

(58) Field of Classification Search ............... 455/550.1, 455/457, 416, 417, 452.3; 345/156, 157, 345/158, 863, 166, 169, 173, 174, 178, 179; 715/862–866

See application file for complete search history.

(56) References Cited

U.S. PATENT DOCUMENTS

| | | | |
|---|---|---|---|
| 6,466,198 B1 * | 10/2002 | Feinstein ................. | 345/158 |
| 6,573,883 B1 * | 6/2003 | Bartlett .................. | 345/156 |
| 7,113,811 B2 | 9/2006 | Goris et al. | |
| 7,630,724 B2 | 12/2009 | Beyer, Jr. et al. | |
| 2004/0125073 A1 | 7/2004 | Potter et al. | |

(Continued)

FOREIGN PATENT DOCUMENTS

| | | |
|---|---|---|
| EP | 1585292 A1 | 10/2005 |
| KR | 10-2002-0006064 A | 1/2002 |

(Continued)

OTHER PUBLICATIONS

Oakley et al., "A Motion-Based Marking Menu System," CHI-2007 Work-In-Progress, Apr. 28-May 3, 2007, San Jose, CA, USA, pp. 2597-2602.

*Primary Examiner* — Fayyaz Alam
(74) *Attorney, Agent, or Firm* — Birch, Stewart, Kolasch & Birch, LLP

(57) ABSTRACT

A mobile device and a method for controlling a user interface of the mobile device are disclosed. According to an embodiment, there is provided a method for controlling a user interface of a mobile device which has a plurality of different operation modes and at least one function predesignated for each of the operation modes, the method comprising: detecting a movement of the mobile device as applied by a gesture of a user; determining a current operation mode of the mobile device among the plurality of operation modes; and performing the at least one function predesignated for the determined current operation mode, according to the detected movement of the mobile device.

7 Claims, 13 Drawing Sheets

U.S. PATENT DOCUMENTS

| | | | |
|---|---|---|---|
| 2004/0130524 A1* | 7/2004 | Matsui | 345/156 |
| 2005/0020306 A1 | 1/2005 | Jin | |
| 2006/0033724 A1 | 2/2006 | Chaudhri et al. | |
| 2006/0105801 A1 | 5/2006 | Cho | |
| 2006/0161871 A1 | 7/2006 | Hotelling et al. | |
| 2006/0164382 A1* | 7/2006 | Kulas et al. | 345/156 |
| 2007/0188450 A1* | 8/2007 | Hernandez et al. | 345/158 |
| 2007/0268246 A1* | 11/2007 | Hyatt | 345/156 |
| 2009/0201246 A1* | 8/2009 | Lee et al. | 345/156 |
| 2009/0293007 A1* | 11/2009 | Duarte et al. | 715/767 |
| 2009/0305785 A1 | 12/2009 | Beeman et al. | |
| 2010/0151946 A1* | 6/2010 | Wilson et al. | 463/36 |
| 2011/0199393 A1* | 8/2011 | Nurse et al. | 345/665 |

FOREIGN PATENT DOCUMENTS

| | | |
|---|---|---|
| KR | 10-2005-0052098 A | 6/2005 |
| KR | 10-2006-0007857 A | 1/2006 |
| KR | 10-2006-0035334 A | 4/2006 |
| KR | 10-0644040 B1 | 11/2006 |
| KR | 10-2007-0004466 A | 1/2007 |
| KR | 10-2007-0007329 A | 1/2007 |
| KR | 10-2007-0065590 A | 6/2007 |
| KR | 10-2007-0068590 A | 7/2007 |
| KR | 10-0844334 B1 | 7/2008 |
| WO | WO 03/001340 A2 | 1/2003 |
| WO | WO-2005/093550 A2 | 10/2005 |
| WO | WO-2007/024085 A1 | 3/2007 |

* cited by examiner

USER INTERFACE FOR A MOBILE DEVICE

CROSS-REFERENCE TO RELATED APPLICATIONS

The present application claims priority under 35 U.S.C. 119 to U.S. Provisional Application No. 61/025,318 filed on Feb. 1, 2008, Korean Patent Application No. 10-2008-0039307 filed on Apr. 28, 2008 and Korean Patent Application No. 10-2008-0068752 filed on Jul. 15, 2008, which are hereby incorporated by reference in its entirety.

BACKGROUND OF THE INVENTION

1. Field of the Invention

The present invention relates to a user interface, and more particularly, to controlling a user interface by detecting a user's gesture applied to a mobile device.

2. Description of the Related Art

There exist many kinds of mobile devices such as a mobile phone, an MP3 player, a PMP (portable multimedia player), a computer notebook, a PDA etc. These devices have limited user interfaces for users to input or output data due to the feature of portability. These mobile devices are usually not used in a fixed place but are used while the user is moving with the devices. Also, the size of the mobile device is relatively small.

As such, it is improper to employ general I/O devices in these mobile devices which are devised for fixed devices such as a QWERTY key board, a mouse or a remote control which is devised for a desktop computer, large size TV, etc.

As such, different kinds of user interfaces have been devised and widely used for the mobile devices such as a touch pad, a touch screen, a navigation pad, etc.

Nevertheless, the mobile devices are still limited for users to input and output data and may be inconvenient to user by the users.

Moreover, in case of mobile phones, tendency is toward adding many kinds of annexed functions to mobile phones such as an MP3 player, a camera, an internet browser, an image viewer, a video player, etc.

Mobile device users often need to use a keyboard especially when the user is browsing an internet webpage through the mobile device to input keywords for a search or password.

In case of a mobile device which substitutes a touch screen for physical buttons such as a full touch screen phone which has a large screen and does not have physical number buttons, if the user needs to input text, he needs to go through a few or more steps by manipulating the menu to have the virtual number buttons show up.

This causes much convenience to the users of the mobile devices. Advanced user interfaces for providing users with easy access to control mobile devices are needed.

SUMMARY OF THE INVENTION

Accordingly, the present invention is to provide various mobile devices and computer software and various methods for controlling the user interface of the mobile devices.

The present invention is to provide an advanced user interface for the mobile devices which have limited input devices by detecting a user's gestures applied to the mobile device.

The user can direct the mobile device to perform various function using gestures according to the present invention.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided according to an embodiment of the present invention a method for controlling a user interface of a mobile device which has a plurality of operation modes, comprising: detecting a gesture of a user; and performing a function corresponding to the detected gesture depending upon the operation mode.

In another aspect of the present invention, there is provided a method for controlling a user interface of a mobile device supporting multiple tasks, comprising: detecting a user's gesture; and switching a task window displayed on the mobile device to another task window among a plurality of active task windows according to the detected gesture.

In another aspect of the present invention, there is provided a method for controlling a user interface of a mobile device, comprising: detecting a gesture of tilting the mobile device to the left or to the right; and performing an action corresponding to a left-click or a right-click on a mouse of a personal computer according to the detected gesture.

In another aspect of the present invention, there is provided a method for controlling a user interface of a mobile device, comprising: detecting a gesture of yawing applied to the mobile device; and performing an action corresponding to a left-click or a right-click on a mouse of a personal computer according to a direction of the yawing gesture.

In another aspect of the present invention, there is provided a method for controlling a user interface of a mobile device, comprising: detecting a gesture of transition applied to the mobile device; and performing an action corresponding to a left-click or a light-click on a mouse of a personal computer according to a direction of the transition.

In another aspect of the present invention, there is provided a method for controlling a user interface of a mobile device supporting multiple tasks, comprising: detecting a gesture of shaking applied to the mobile device; and closing all the active task windows of the mobile device.

In another aspect of the present invention, there is provided a method for controlling a user interface of a mobile device which has a plurality of different operation modes and at least one function predesignated for each of the operation modes, the method comprising: detecting a movement of the mobile device as applied by a gesture of a user; determining a current operation mode of the mobile device among the plurality of operation modes; and performing the at least one function predesignated for the determined current operation mode, according to the detected movement of the mobile device.

In another aspect of the present invention, there is provided a method for controlling a user interface of a mobile device configured to support multiple tasks, the method comprising: detecting a movement of the mobile device as applied by a user's gesture; moving from a task window displayed on the mobile device to another task window according to the detected movement of the mobile device, when the mobile device includes a plurality of active task windows; and displaying, on a display of the mobile device, a part or entirety of one or more active task windows according the moving step.

In another aspect of the present invention, there is provided a method for controlling a user interface of a mobile device, the method comprising: detecting a gesture of one of tilting, yawing, or transitioning the mobile device to the left or to the right; and performing an action corresponding to a left-click or a right-click on a mouse of a personal computer according to the detected gesture.

In another aspect of the present invention, there is provided a method for controlling a user interface of a mobile device configured to support multiple tasks, the method comprising: determining if a predetermined movement of the mobile device as applied by a user's gesture is detected, when there exist a plurality of active task windows on the mobile device; and closing all the active task windows of the mobile device when the predetermined movement of the mobile device is detected.

In another aspect of the present invention, there is provided a mobile device which has a plurality of different operation modes and at least one function predesignated for each of the operation modes, the mobile device comprising: a detector configured to detect a movement of the mobile device as applied by a gesture of a user; and a controller configured to determine a current operation mode of the mobile device among the plurality of operation modes; and to perform the at least one function predesignated for the determined current operation mode, according to the detected movement of the mobile device.

In another aspect of the present invention, there is provided a mobile device for controlling a user interface, the mobile device configured to support multiple tasks and comprising: a detector configured to detect a movement of the mobile device as applied by a user's gesture; a display; and a controller, by controlling the display, configured to move from a task window displayed on the display to another task window according to the detected movement of the mobile device, when a plurality of task windows are active; and to display, on the display, a part or entirety of one or more active task windows according to said moving to the another task window.

In another aspect of the present invention, there is provided a mobile device for controlling a user interface, the mobile device comprising: a detector configured to detect a gesture of one of tilting, yawing, or transitioning the mobile device to the left or to the right; and a controller configured to perform an action corresponding to a left-click or a right-click on a mouse of a personal computer according to the detected gesture.

In another aspect of the present invention, there is provided a mobile device for controlling a user interface, the mobile device configured to support multiple tasks and comprising: a detector configured to detect a predetermined movement of the mobile device as applied by a user's gesture; and a controller configured to determine if the predetermined movement of the mobile device is detected, when there exist a plurality of active task windows on the mobile device; and to close all the active task windows of the mobile device when the predetermined movement of the mobile device is detected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
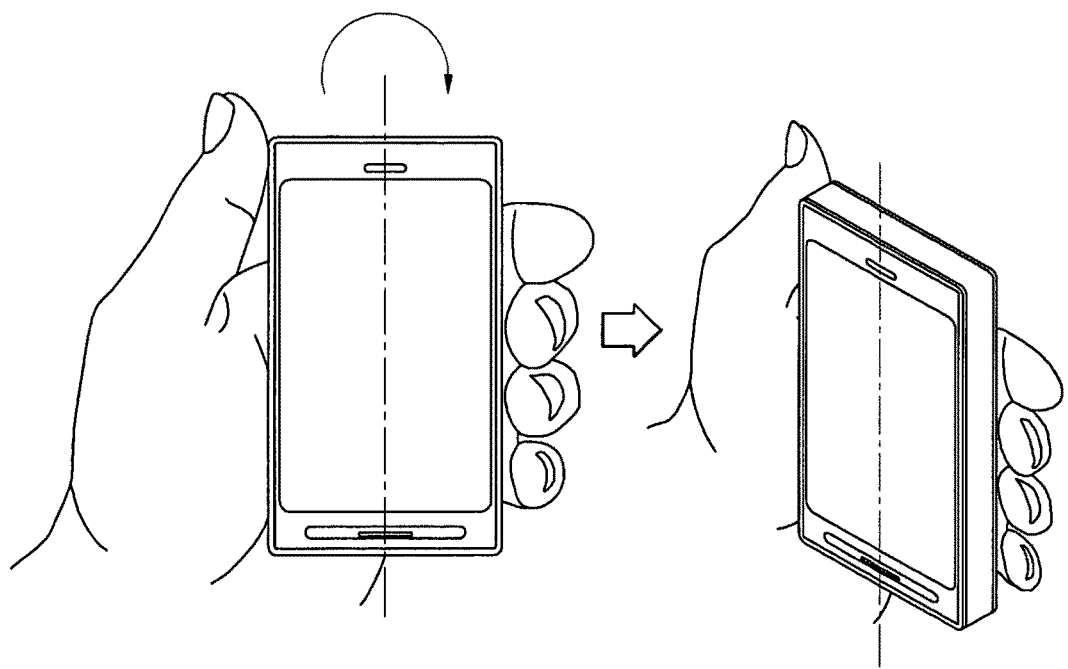
FIGS. 1A and 1B show an example of a controlling method for a mobile device using gestures of a user according to an embodiment of the present invention.
Figure 1B:
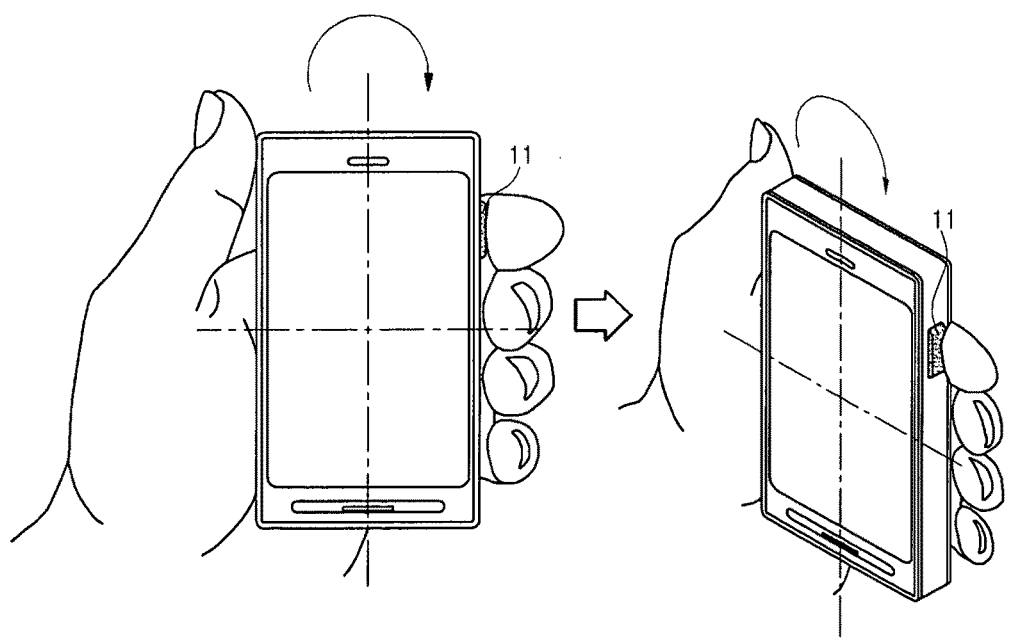

FIGS. 1A and 1B show a user interface controlling method of a mobile device using a user's gestures applied to the mobile device according to an embodiment of the present invention.

The mobile device according to the embodiments of the present invention may include, but is not limited to, a mobile phone, an MP3 player, a PMP (Portable Multimedia Player), a computer notebook, a PDA, a smart phone, etc.

The mobile device according to the embodiments of the present invention may be equipped with an inertia sensor which can detect a user's gestures applied to the mobile device. The gesture may include at least one of rolling, pitching, yawing, and transition, or any combination thereof, which will be discussed later in more detail. The inertia sensor may comprise a gyro sensor, a tilt sensor, an acceleration, etc. or other known sensors. Further, the mobile device may include a proximity sensor or distance sensor for detecting a position of the mobile device with respect to the user.

In the following detailed description, the embodiments of the present invention are described assuming a case where the mobile device is a mobile phone only as a non-limiting example. However, the present invention is equally and fully applicable to any type of mobile device or portable electronic device.

The mobile phone in the accompanying drawings is a so-called "full touch screen phone" which has no physical number buttons on the front surface of the mobile phone and a display of the mobile phone covers most of the front surface of the mobile phone.

As shown in FIG. 1A, as an example, if the user tilts the mobile phone to the right side while grabbing the mobile device, the inertia sensor in the mobile phone may detect this tilting gesture.

If the detected gesture is tilting to the right side (or in other direction), a controller of the mobile phone may direct the mobile phone to perform a function corresponding to the gesture such as scrolling the display, changing the audio volume up and down, zooming in and out, etc., which will be discussed in more detail later.

In one embodiment, as shown in FIG. 1B an activation button 11 may be equipped on a side of the mobile phone, and the controller of the mobile phone may be responsive to the user's gesture applied to the mobile device only when the button 11 is pushed. That is, the mobile phone may be configured to respond to the user's gesture to perform functions not always, but only in a specific mode (hereinafter referred to as a "gesturing mode").

Alternatively, the gesturing mode may be activated and the mobile phone may be responsive to the user's gesture as applied to the mobile phone only when a predetermined area of a touch screen of the mobile phone is being touched.

An activating scheme for activating the gesturing mode of the mobile device may be widely varied. For example, in one embodiment, the mobile phone may enter the gesturing mode by manipulation of the software embedded in the mobile phone without a user selecting the physical button 11.

Alternatively, a certain gesture of the user may be preset as one for entering the gesturing mode. The mobile phone may enter or exit from the gesturing mode when the certain gesture by the user is applied to the mobile phone. For example, if the user quickly shakes the mobile phone once, the mobile phone may enter the gesturing mode and perform the function corresponding to the detected gesture. If the user quickly shakes the mobile phone once again, the mobile phone may exit out from the gesturing mode. Other gestures may be set as the gesture for entering or exiting out from the gesturing mode.

The gesture for activating or entering the gesturing mode and the one for deactivating or exiting from the gesturing mode may be different or the same. If they are the same, whenever this gesture is applied to the mobile phone, the operation mode may be switched between the gesturing mode and the non-gesturing mode. In one example, the user may be able to set a gesture preferred by the user to be the gesture for entering the gesturing mode and/or the gesture for exiting the gesturing mode.

In one embodiment, the gesturing mode may be activated when the mobile phone is positioned such that the display faces a direction at a predetermined angle with respect to the ground/floor and is maintained at that position for a predetermined time. For example, when the user holds the mobile phone such that the display of the mobile phone faces a certain direction at a predetermined angle for a predetermined time, for example, 3 seconds, the gesturing mode may be activated. Other examples are possible.

In another embodiment, the power supply to the display of the mobile phone may be cut off for saving power if there is no input from the user for more than a certain time, and the gesturing mode may be automatically deactivated when the power supply to the display is cut off for saving power as well.

FIGS. 2A through 2E show a controlling method of a user interface of a mobile device by using a user's gesture depending upon what operation mode the mobile phone is currently in according to an embodiment of the present invention.

Recently, tendency is toward adding many kinds of annexed functions to mobile devices such as mobile phones, PMPs, MP3 players other than their main functions. The annexed functions comprise MP3 player, photographing, internet browsing, photo viewer, video player, TV receiver, voice recording, electronic organizer, etc. PDAs or notebooks originally can provide various functions by installing various kinds of software.

In one embodiment of the present invention, a gesture of a user as applied to the mobile device may used for controlling different functions depending on the different operation modes of the mobile device.

Figure 2A:
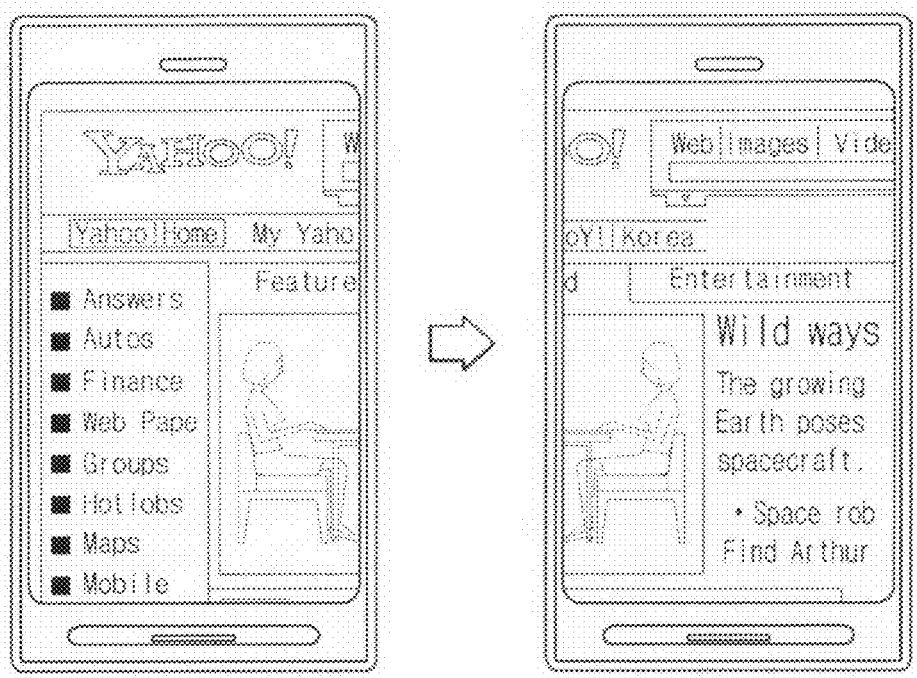
FIGS. 2A through 2E show embodiments of a user interface controlling method depending on the operation mode of the mobile device according to the present invention.

FIG. 2A shows a case where the user is browsing the internet web page through a mobile phone.

In this example, the left side of FIG. 2A shows a part of the internet webpage being browsed and displayed on a display of the mobile device. While or after the gesturing mode is activated, if the user tilts the mobile phone to the right by a certain angle as shown in FIG. 1A or 1B, the webpage displayed on the display of the mobile phone is scrolled to the right.

That is, if the user tilts the mobile phone to the right by a certain angle, an inertia sensor detects this motion applied to the mobile phone and the controller of the mobile phone directs the page/image on the display to be scrolled to the right. Likewise, if the user tilts the mobile phone to the left, the page/image on the display may be scrolled to the left. If the user tilts the mobile phone from top to bottom or vice versa, that is, the mobile phone is tilted such that the top of the display faces downwardly (e.g., the upper part of the mobile device is tilted towards the user), the page/image on the display may be scrolled down. If the mobile phone is titled such that the bottom of the display faces upwardly, the page/image displayed on the display may be scrolled up. The present invention causes scrolling of a page on the display in the direction that corresponds to the direction of tilting of the mobile device, where this direction may be any direction (e.g., diagonal) and may not be limited to the right, left, up and down.

In one embodiment whenever the mobile phone is tilted by more than a predetermined angle, the page/image on the display may be scrolled by a predetermined distance. That is, the page/image on the display may be scrolled by a predetermined distance when the tilted angle is more than a threshold value. Alternatively, the page/image on the display may be scrolled if the mobile phone is even slightly tilted and the scrolling distance may be proportional to the tilted angle.

In one embodiment, the scrolling speed may be configured to be proportional to the tilted angle.

The scrolling direction according to the user's tilting gesture may be widely varied. For example, in contrast to the above embodiments, when the mobile device is tilted to the right, the display (e.g., image/page on the display) may be scrolled to the left, or when the mobile device is tilted such that the top of the display faces downwardly, the display may be scrolled up, and so on. Further, depending on the tilting movement of the mobile device, the image/page displayed on the display may be zoomed in or out. For example, in the web browsing mode, if the mobile device is moved forwardly (closer to the user) and backwardly (away from the user), then the image/page on the display may be zoomed in and out or vice versa, respectively.

According to an embodiment, the mobile device is configured such that the user can set a desired scrolling direction for each feature or tilting direction. For example, if desired, the user can configure the mobile device so that the tilting the mobile device to the right causes the displayed page/image to scroll downwardly or in other specific direction. In fact, the user may be able to set how any user gesture discussed herein may be matched up to correspond with any user interface controlling discussed in the present specification. As a result, a more user-preferred page scrolling is provided by the present invention.

In one embodiment of the present invention, while playing a multimedia file such as an audio file, video file, or photograph file, a predetermined function may be performed by detecting a certain gesture applied to the mobile device.

Figure 2B:
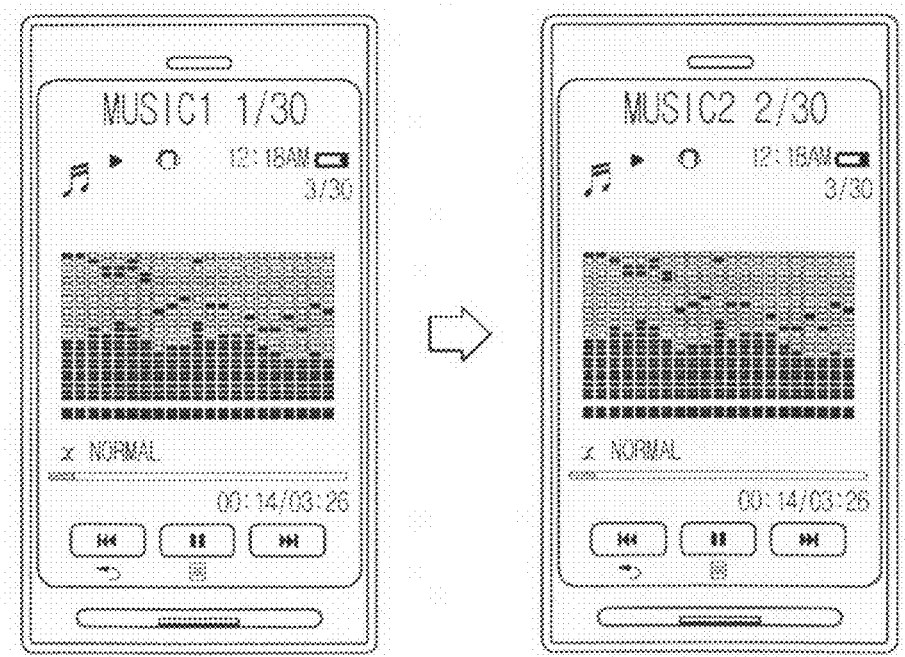

FIG. 2B shows an embodiment where the mobile phone according to the present invention is playing an audio file.

To the left of FIG. 2B, a display of the mobile device is shown where the first audio file MUSIC1 (out of 30 audio files) is being played. If the user tilts the mobile phone to the right by a certain angle as shown in FIG. 1A or 1B, the inertia sensor of the mobile device may detect this gesture as applied to the mobile device and as a result, the second audio file MUSIC2 may be played as shown on the right side in FIG. 2B.

Figure 2C:
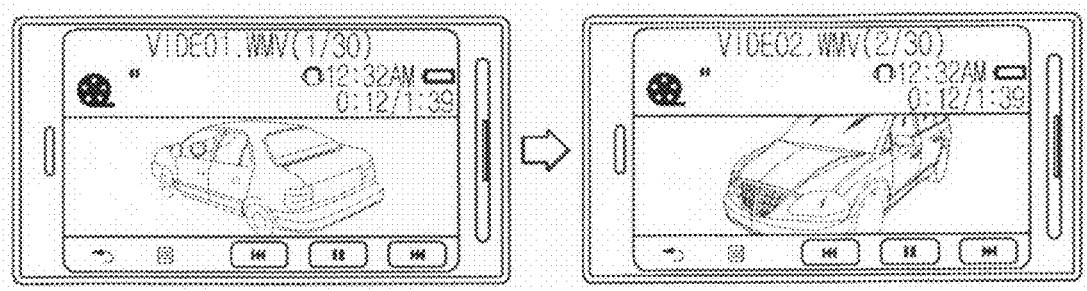
Figure 2D:
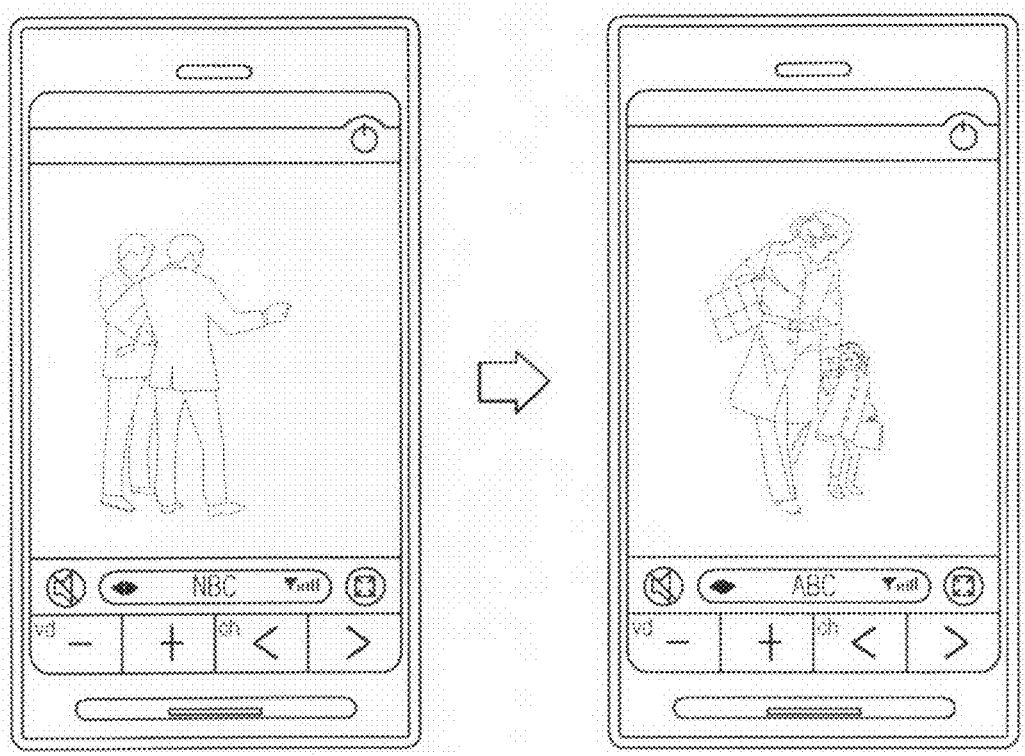
Figure 2E:
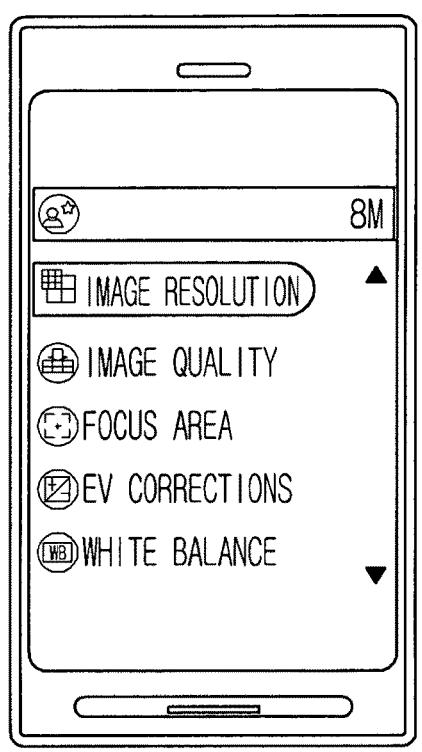

That is, in the present invention, if a gesture of tilting a mobile phone to the right is detected, the function to be performed may be different depending on what the current operation mode of the mobile phone is. In the example of FIG. 2A, since the current operation mode of the mobile device is web browsing, the user's gesture applied to the mobile device results in page scrolling. In contrast, in the example of FIG. 2B, since the current operation mode of the mobile device is an MP3 player operation, the user's gesture applied to the mobile device results in controlling a playback operation of audio data. FIGS. 2C-2E, to be discussed later, provide other examples of how a different function is performed based on the user's gesture, depending on the current operation mode of the mobile device.

Returning to FIG. 2B, if the mobile phone is tilted to the left, the previous audio file (e.g., MUSIC1) may be played. The user may flick the mobile phone to the left/right or up/down to cause the file-to-file (or song-to-song) scrolling, where the number of files/songs scrolled to corresponds to the number of flicks. Other functions (e.g., fast-forwarding or fast-backwarding to different parts within a single audio file/song, etc.) associated with the MP3 player operation or audio recording/reproducing operation of the mobile device may also be controlled according to the user's gestures.

According to another example of the invention, the mobile device may be configured so that an audio volume of the mobile phone/device is turned up or down if the mobile phone is tilted up or down (or any other specified direction).

In the above embodiments, it is assumed that the gesturing mode is activated and any scheme to activate the gesturing mode as described in the foregoing may be employed.

FIG. 2C shows an embodiment where the mobile phone is playing a video file.

To the left of FIG. 2C, the display of the mobile phone is shown where the first video file VIDEO1.wmv (among 30 video files) is being played. If the user tilts the mobile device by a certain angle, the inertia sensor of the mobile phone detects this motion and as a result the second video file VIDEO2.wmv may be played as shown to the right of FIG. 2C.

That it, when a certain gesture of tilting the mobile device to the right is applied, if the mobile device is in the vide file playing mode, the next video file may be played. Also, if a gesture of tilting the mobile device to the left, the previous file may be played. Similar to the user interface controlling methods of FIG. 2B, the user may flick the mobile phone to the left/right or up/down to cause the file-to-file (or video-to-video or chapter-to-chapter) scrolling, where the number of files/chapters scrolled to corresponds to the number of flicks. Further, a continuous scrolling through the video file(s) may occur if the mobile device is moved in a certain manner (e.g., continuous scrolling through the video in the forward direction may occur if the user flicks to the right once while pressing a certain button on the mobile device in the video mode). Other functions (e.g., fast-forwarding or fast-backwarding to different parts within a single video file or the entire movie, etc.) associated with the video recording/reproducing operation of the mobile device may also be controlled according to the user's gestures.

In the examples of FIGS. 2B and 2C, If a gesture of tilting the mobile device up or down, the audio volume of the mobile device may be turned up or down or the brightness of the display may be increased or decreased.

In the above embodiment where the audio volume is turned up or down, the mobile device may be configured so that whenever the mobile device is tilted, the volume may be turned up or down step by step. When the volume is turned up or down, it may be visualized as shown in FIG. 5B.

In still another example, when the mobile phone is in the photo view mode, if the mobile phone is tilted to the right or to the left (or any other designated direction), the next photo or the previous photo (e.g., photos prestored) may be displayed on the display. If the mobile phone is tilted up or down, the photo currently being viewed may be zoomed in or zoomed out or the mobile phone may exit out of the photo view mode. FIG. 2D shows an embodiment where the mobile phone/device is in a TV or broadcast mode.

To the left of FIG. 2D, a program of a TV/broadcast channel (e.g., NBC) is being shown on the display of the mobile phone/device. If the user tilts the mobile phone to the right by a certain angle as shown in FIG. 1A or 1B, the inertia sensor of the mobile device detects this motion and the next channel to the current channel, say, ABC may be tuned in and shown on the display as shown on the right of FIG. 2D.

That is, when a gesture of tilting the mobile phone to the right is detected, if the mobile phone is in a TV receiver mode or other broadcast mode, the controller may direct the receiving module of the mobile phone, such as DVB-H module or DMB module, to change the channel. Likewise, if the mobile phone is tilted to the left, the previous channel may be tuned in and shown. If the mobile phone is tilted up or down, the audio volume in the TV/broadcast mode may be turned up or down, or the brightness of the display in the TV/broadcast mode may be increased or decreased.

In the above embodiment, it is assumed that the gesturing mode is activated and any scheme to activate the gesturing mode as described in the foregoing may be employed.

FIG. 2E shows an embodiment where the mobile phone is in the photographing mode.

In the conventional mobile phone which has a camera module, the user needed to manually manipulate the menu embedded in the mobile phone to have control menus shown on the display such as image resolution, image quality, night mode, landscape mode, video mode.

Some mobile devices such as a mobile phone are not dedicated to camera and have multiple functions. As such, the user does not easily know which button is for controlling menus for the camera. It is more difficult for the user recognize which button is for controlling the camera menus especially in case of the full touch screen phone, since the full touch screen phone does not have many physical buttons on it.

In this case, the user interface using the user's gesture according to the present invention is advantageous to the user as follows.

In the photographing mode where the user is attempting to photograph an image using the camera of the mobile device, if the user tilts the mobile phone to the right or to the left (or in other designated manner) as shown in FIG. 1A or 1B, the inertia sensor may detect this motion and display menus necessary for controlling camera functions as shown in FIG. 2E. In another example, when the mobile device is in the photographing mode, if the mobile device is moved up or down by the user, then the image to be photographed as displayed on the display may be zoomed in or out. As a variation, when the mobile device is in the photographing mode, if the mobile device is moved forward (toward the user) or backward (away from the user), then the image to be photographed as displayed on the display may be zoomed in or out.

In another example, when a gesture of tilting the mobile phone to the right is detected, if the mobile phone is in the TV receiver or broadcast mode, the controller of the mobile phone may direct the mobile phone to display necessary menus for controlling camera functions.

If the user tilts the mobile phone to the other direction, a different menu may be shown or the mobile phone may start any of the most frequently used functions in the photographing mode.

If the mobile phone is tilted up or down, the flash may be rendered to be ready or the volume of the feedback sound may be turned up or down.

Alternatively, if the mobile phone is tilted up or down, the resolution of the photograph to be taken may be adjusted. In this case, preferably the change of the resolution of the photograph may be shown on the display.

Similarly to other embodiments, it is assumed that the gesturing mode is activated and any scheme to activate the gesturing mode as described in the foregoing may be employed.

In other operation modes which may be annexed to the mobile phone, such as electronic organizer, radio receiver, etc. the gesture of tilting the mobile may be assigned to perform a certain function.

As discussed above, the functions to be performed by the gesture of tilting may be widely varied for the various operation modes of the mobile device.

In the foregoing description, embodiments where a gesture of tilting the mobile phone is used for controlling a user interface have been described. However, the gestures which are detected by the inertia sensor and can be used for controlling the user interface may widely vary.

Figure 3:
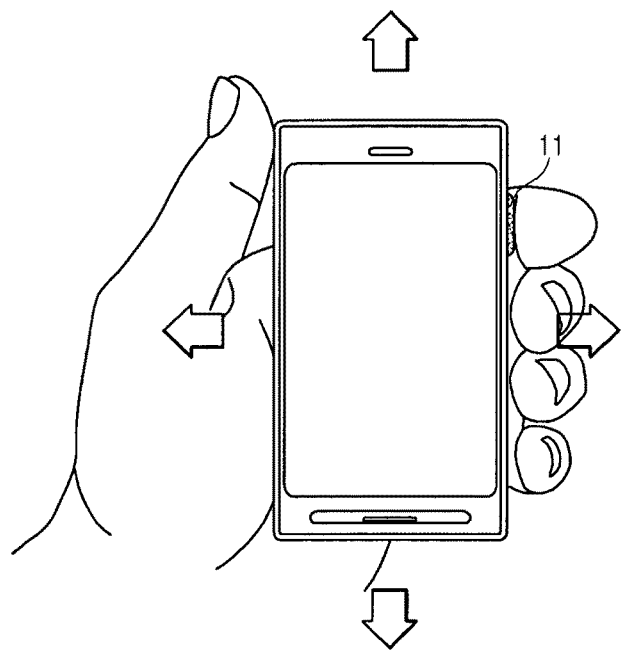
FIG. 3 shows an example of a controlling method of a mobile device using a user's gesture according to an embodiment of the present invention.

FIG. 3 shows a controlling method of a mobile device using a user's gesture according to an embodiment of the present invention.

The motion and the motion speed of the mobile device may be detected by mounting an inertia sensor such as gyro sensor, acceleration sensor etc.

As shown in FIG. 3, a gesture of moving the mobile device in parallel to the user's body may be used for controlling the user interface of the mobile device such as a mobile phone. The activation button 11 for activating the gesturing mode, or for triggering some other function may be mounted on the mobile phone. That is, here in FIG. 3, the gesture applied to the mobile device is a lateral movement (transition) and not necessarily a tilting movement (rolling or pitch). Thus, the user interface controlling methods discussed in connection with FIGS. 2A-2E may be applicable to a gesture of moving the mobile device laterally as shown in FIG. 3; however, the same methods may be applied to other types of gestures (e.g., yawing/pivoting, etc.) as applied to the mobile device.

For example, assuming that the user is browsing the internet web site using the mobile phone as shown in FIG. 2A, if the user moves the mobile phone as shown in FIG. 3, the display of the mobile phone may be scrolled over the web page being browsed according to the moving direction.

When the mobile phone is in an audio file playing mode, if the mobile phone is moved to the right or left as shown in FIG. 3, the next audio file or the previous audio file may be played. If the mobile phone is moved up or down, the audio volume of the mobile phone may be turned up or down.

When the mobile phone is in a video file playing mode, if the mobile phone is moved to the right or left as shown in FIG. 3, the next video file or the previous video file may be played. If the mobile phone is moved up or down, the audio volume of the mobile phone may be turned up or down.

When the mobile phone is in a TV receiver mode or a broadcast mode for receiving and processing broadcast signals, if the mobile phone is moved to the right or left as shown in FIG. 3, the next channel or the previous channel may be tuned in and shown. If the mobile phone is moved up or down, the audio volume of the mobile phone may be turned up or down.

When the mobile phone is in a photographing mode, if the mobile phone is moved to the right or left as shown in FIG. 3, a control menu may be displayed and if the mobile device is moved up or down, the displayed image to be captured may be zoomed in or out.

Figure 4:
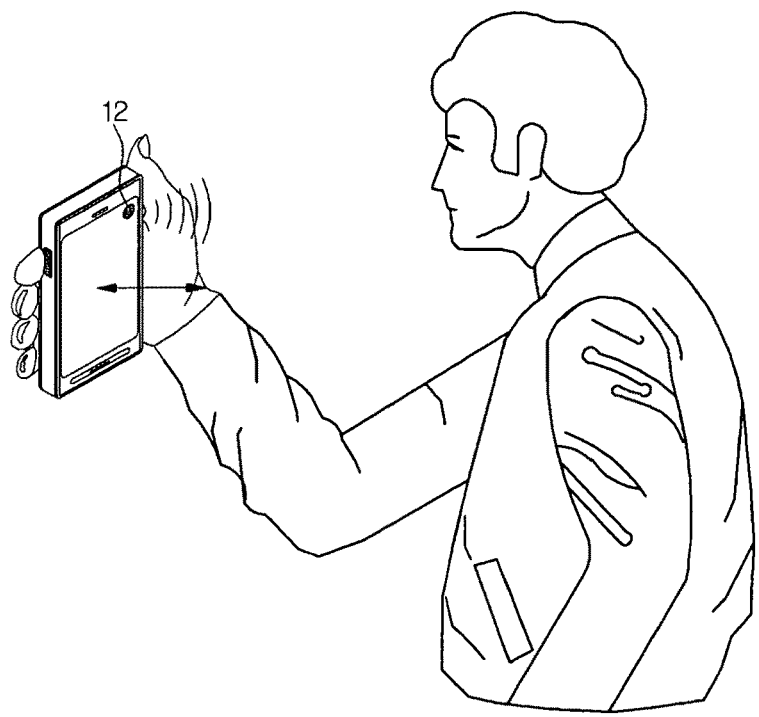
FIG. 4 shows an example of a user interface controlling method using a user's gesture according to an embodiment of the present invention.

FIG. 4 shows a controlling method of a mobile device using a gesture according to an embodiment of the present invention.

The motion of a mobile device may be detected by mounting a proximity sensor 12 such as PSD sensor and detecting the distance (or distance relationship) between the mobile device and the user's body. By detecting the motion of the mobile device back and forth to the user's body, the user interface may be controlled accordingly.

The proximity sensor 12 according to the present invention comprises sensors which can detect whether the mobile device is close to the user's body. The proximity sensor 12 may be based on sensing technologies including capacitive, electric field, inductive, Hall effect, reed, eddy current, magneto resistive, optical shadow, optical visual light, optical IR, optical color recognition, ultrasonic, acoustic emission, radar, heat, sonar, conductive or resistive and the like.

Figure 5A:
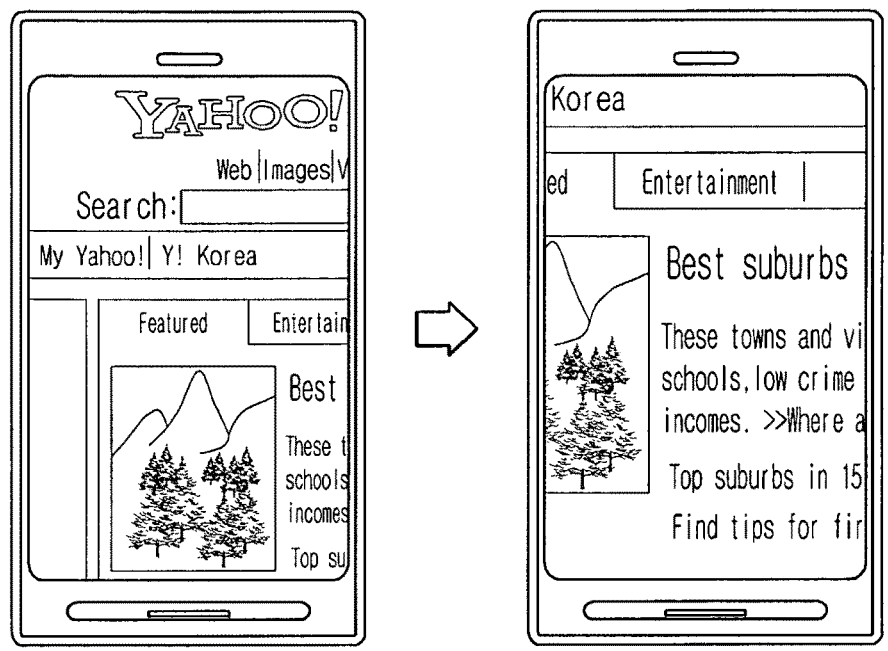
FIGS. 5A and 5B show an example of a user interface controlling method according to an embodiment of the present invention.
Figure 5B:
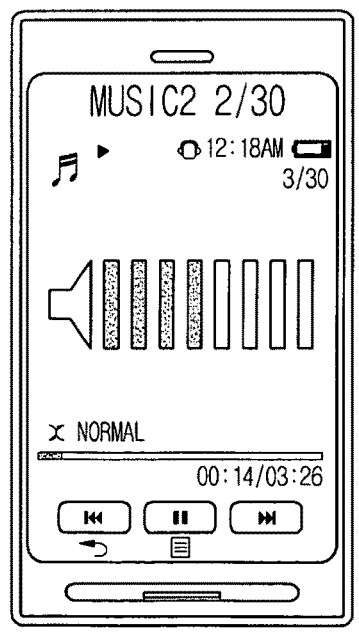

When the mobile device is in the internet/web browsing mode, if the user brings the mobile device towards his body, the proximity sensor 12 may detect the proximity to the user's body and the controller of the mobile device such as a mobile phone may direct the mobile device to zoom in the web page being browsed as shown in FIG. 5A. Conversely, if the mobile device is moved away from the user, the web page on the display may be zoomed out.

When the mobile device is in a different operation mode, a different function may be performed according to the proximity between the user and the mobile device.

For example, when the mobile device is in the audio file playing mode, the audio volume may be turned up if the mobile device gets close to the user's body (e.g., based on a predetermined reference point) and turned down if the mobile device gets away from the user's body as shown in FIG. 5B.

When the mobile device is in the video file playing mode, the audio volume may be turned up or down and/or the display may be zoomed in or out according to the proximity between the user's body and the mobile device.

Alternatively, a control menu including progressive bar may be shown or hidden according to the proximity between the user's body and the mobile device.

Alternatively, the brightness of the display may be changed according to the proximity between the user's body and the mobile device.

Likewise, in the TV receiver or broadcast mode, the display may be zoomed in or out, and/or the audio volume may be turned up or down according to the proximity between the user's body and the mobile device.

In the photographing mode, the image to be captured as displayed on the display may be zoomed in or out according to the proximity between the user's body and the mobile device.

As such, a gesture of the user may be used for controlling the mobile device and the function to be performed by the gesture may be different depending upon the operation mode of the mobile device.

In one embodiment, several gestures which can be detected by sensors mounted on a mobile device, and each function to be performed by each of the gestures may be assigned by the user as necessary or if desired.

For example, if a gesture of tilting the mobile device is detected, a user defined menu may be displayed on the display of the mobile device. The gesture shown in FIG. 1A or 1B may referred to or set by the user as a rolling gesture, where the mobile device is tilted to the right or left. Also, the gesture shown in FIG. 3 or 4 may referred to or set by the user as a transition gesture, where the mobile device is moved to the bottom, top, right or left.

In one embodiment of the present invention, other kinds of gesture than the above gestures may be used for controlling the user interface of the mobile device.

Figure 6:
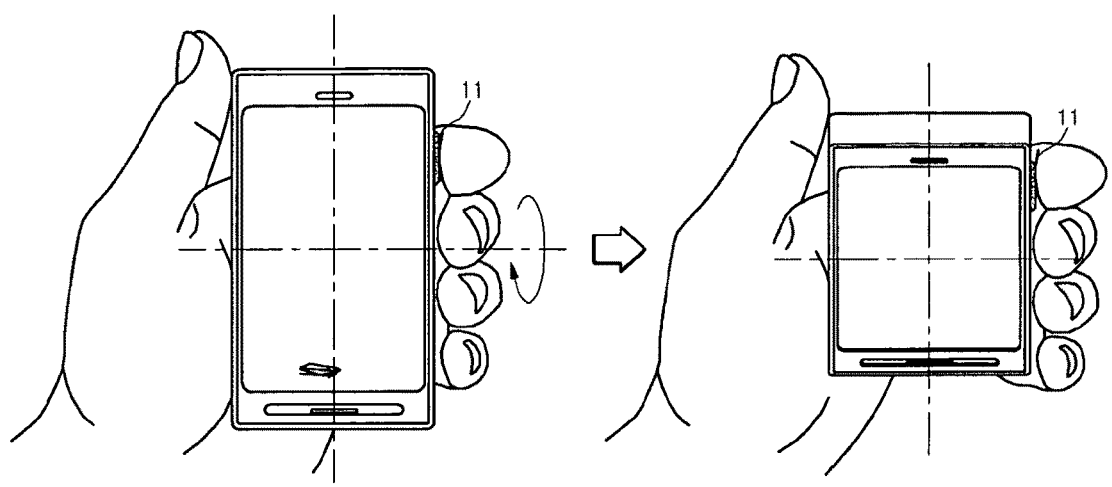
FIGS. 6 through 9 shows embodiments of a controlling method of a user interface using a user's gestures according to the present invention.

As shown in FIG. 6, the mobile device may be tilted upwardly or downwardly so that the front side of the mobile device faces downwardly or faces upwardly. Such a gesture may be referred to as a pitching gesture. Tilting the mobile device to the right or left may be referred to as a rolling gesture. Pitching and rolling gestures are different types of tilting gestures.

Figure 7:
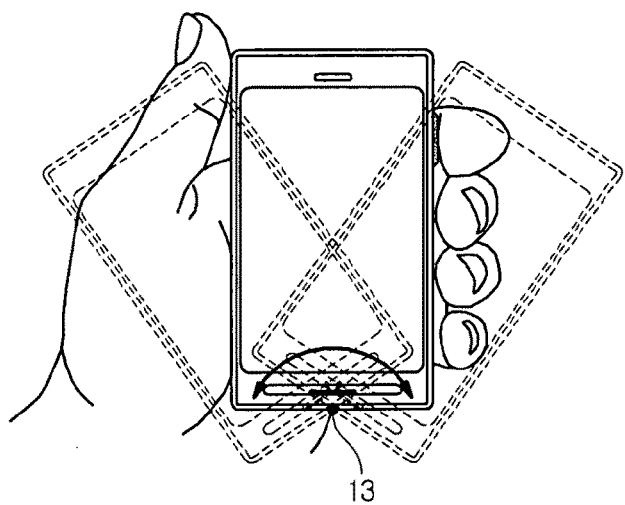

Also, as shown in FIG. 7, the mobile device may be moved pivotally to make a fan shape on an axis point 13. Such a gesture may be referred to as a yawing gesture. Also, a lateral movement as shown in FIG. 3 may be referred to as a transition gesture.

In embodiments of the present invention, the above gestures or the combination thereof may be employed to browse the internet web pages or to perform other operations discussed herein.

As a non-limiting example, the above gestures may be employed to switch between multiple web pages when the user is viewing the internet web pages through the mobile device and multiple task windows are active on the mobile device.

Figure 8:
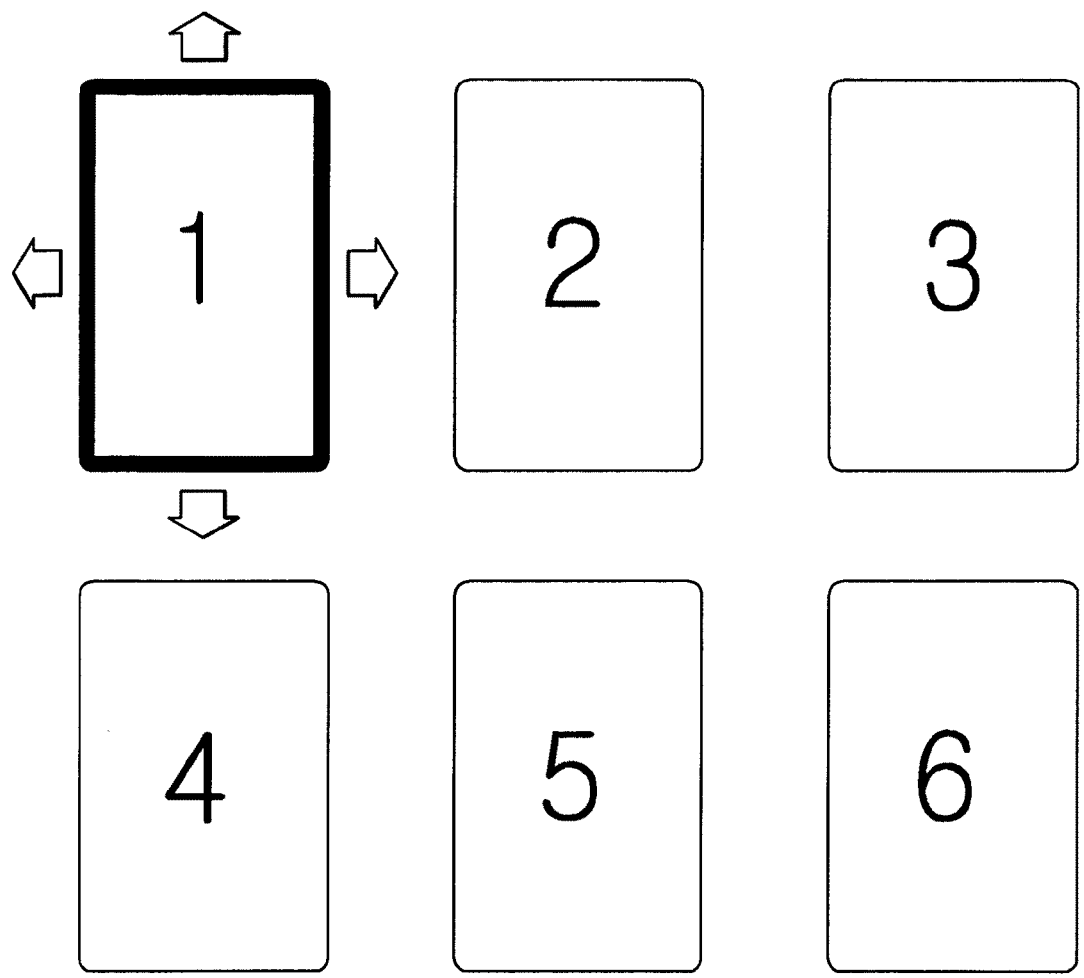

For instance, assume six task windows are active, and those six task windows are virtually arranged as 2 rows and 3 columns as shown in FIG. 8. Also, window 1 is now being displayed entirely on the display of the mobile device among the six active task windows. If the user applies a rolling gesture as in FIG. 1A or 1B, the displayed task window may be switched to another task window according to the gesture, e.g., window 2 or 4.

Alternately, the displayed task window may be switched to another window by applying a yawing gesture as shown in FIG. 7 or a transition gesture as shown in FIG. 3 or 4.

A pitching gesture as shown in FIG. 6 may be employed to switch between task windows. The currently displayed window 1 may be switched to window 4 by applying a pitching gesture which causes the displayed window to be switched up or down in the arrangement of the virtual web pages according to the applied gesture.

In one embodiment of the present invention, an activation button 11 as shown FIG. 1B may be equipped on the mobile device and the above gestures may be effective to switch the task windows only when the user pushes and holds down on the activation button.

Figure 9:
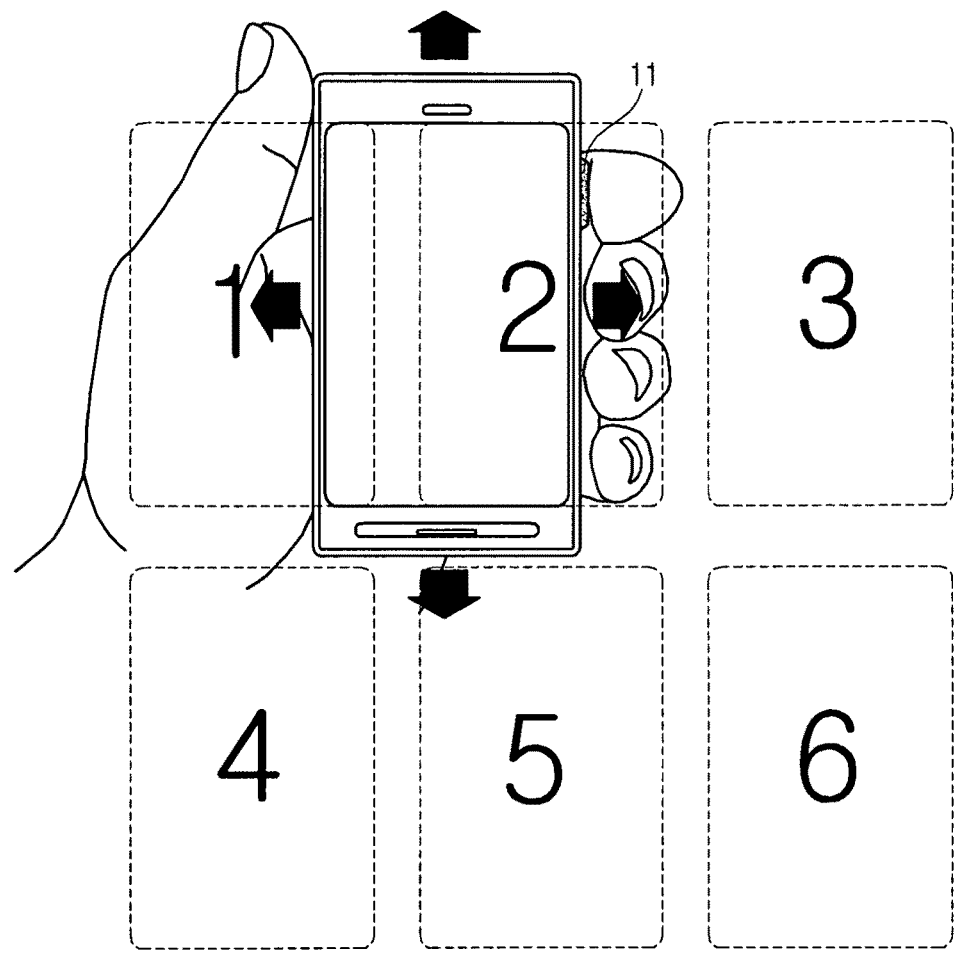

In one embodiment of the present invention, a seamless switching between the task windows may be made by applying a transition gesture while multiple task windows are active. That is, parts of one or more of a plurality of task windows may be shown on the display of the mobile device according to the transition gesture as shown in FIG. 9. For example, as the user moves the mobile device laterally as a transition gesture, then the display smoothly displays the parts of the task windows covered by the display according to the direction of the transition gesture as shown in FIG. 9. Such a transition gesture may be effective to switch or display through the task windows only when the user pushes and holds down on the activation button 11. In still another example, the user may be able to zoom in and out of the display (e.g., using a gesture) to display one or more multiple pages or multiple task windows. If multiple task windows are simultaneously displayed on the display by this zooming in/out act then the user may select one of the task windows by, e.g., touching that task window or by some other selection manner.

In one embodiment of the present invention, a user's gesture as applied to the mobile device may be used as a left-click or right-click on a mouse for a personal computer.

For example, while browsing the internet web pages using the mobile device, if the use applies a rolling gesture of tilting the mobile device to the left, any same action caused by a left-clicking on a mouse/cursor on a personal computer may be performed. For instance, a hyperlink where the cursor or pointer is positioned on the web page may be executed by tilting the mobile device to the left and a menu may be displayed by titling the mobile device to the right.

Alternately, a yawing gesture or a transition gesture may be used as a left-click or right-click operation as well.

According to one embodiment, the above gestures may be effective only when the user pushes and holds down on a physical button on the mobile device or only in a certain action mode.

Figure 10:
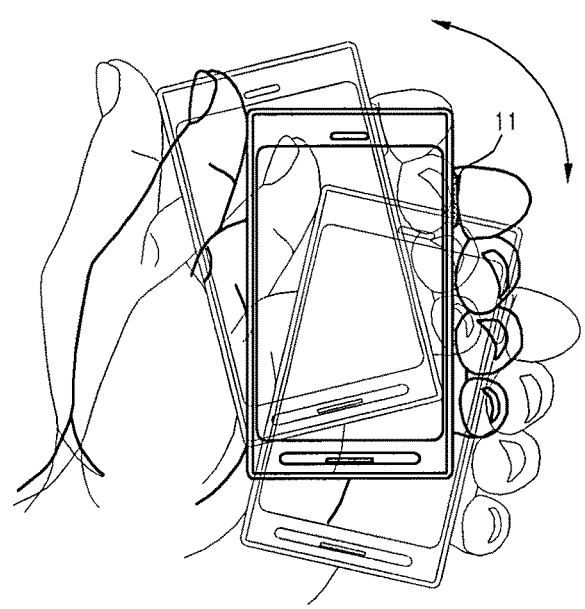
FIG. 10 shows an example of a gesture which may be used to control the user interface of the mobile interface according to the present invention.

In one embodiment of the present invention, when a plurality of task windows are active on the mobile device, the plurality of task windows may be closed at a time or simultaneously by detecting a specific user gesture applied to the mobile device. For example, as shown in FIG. 10, if the user shakes the mobile device once or several times with or without pressing the button 11 when the multiple task windows are all active, the motion sensor of the mobile device may detect this motion and close all the active task windows. After that, a main menu, that is, the top level menu, or any other menu (which may be designated or set by a user) may be displayed on the mobile device.

Various embodiments and examples of the methods and operations of the present invention discussed above are implemented in a mobile device or portable electronic device. An example of such a device as a mobile device 100 is discussed below referring to FIGS. 12 and 13. A controller 180 of the mobile device 100 may be configured to control a display 151 (which may be a touch screen) to perform the various user interface controlling methods of the present invention discussed above. The mobile device of the present invention may have all or part of the components of the mobile device 100.

Figure 11:
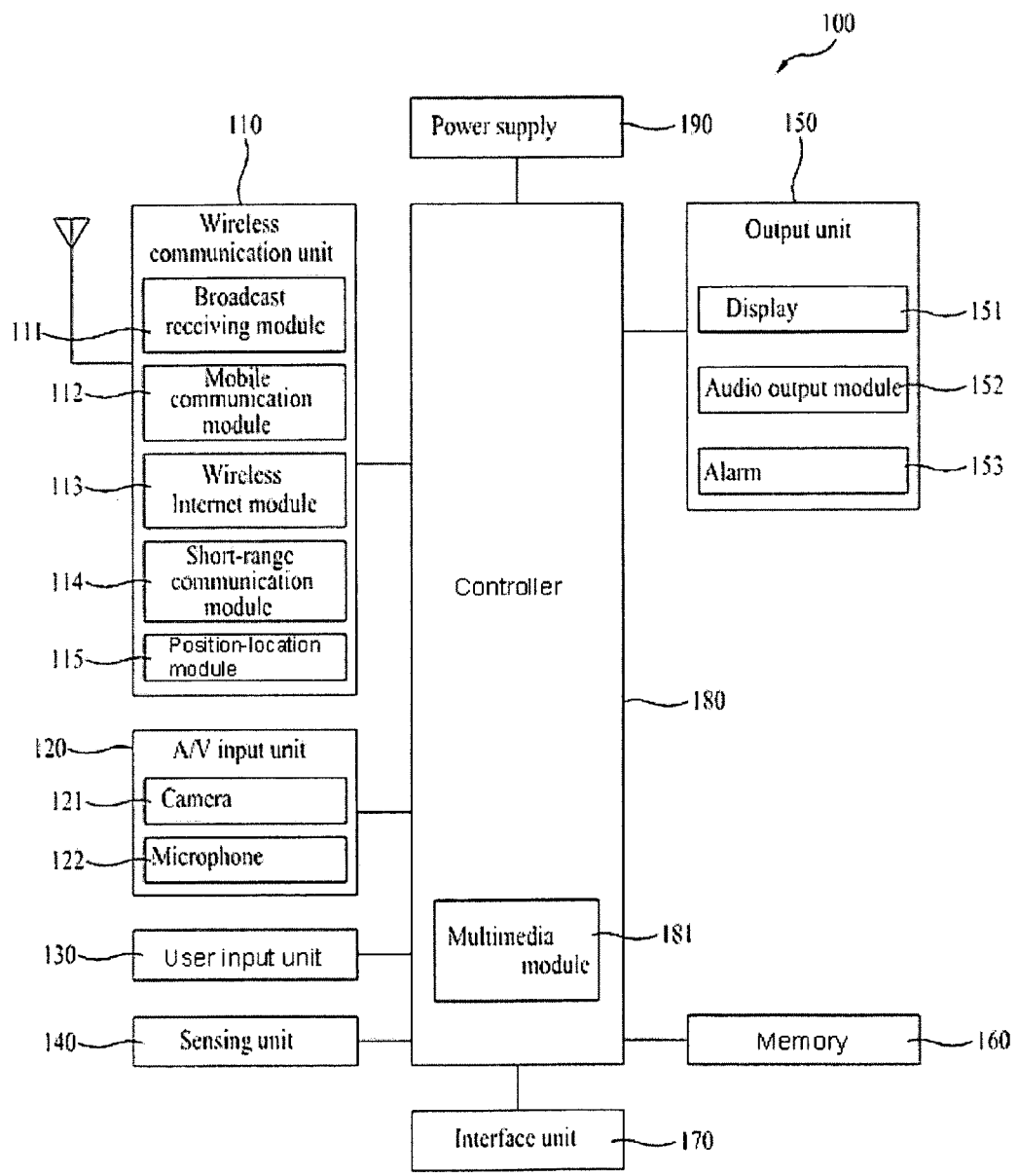
FIG. 11 is a block diagram of a mobile device in accordance with an embodiment of the present invention.

FIG. 11 is a block diagram of mobile device 100 in accordance with an embodiment of the present invention. The mobile device may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to a mobile device. However, such teachings apply equally to other types of devices. FIG. 11 shows the mobile device 100 having various components, but it is understood that implementing all of the illustrated components is not a requirement. Greater or fewer components may alternatively be implemented.

FIG. 11 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc. or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 11 further shows an output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 11 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile device 100 of FIG. 11 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 12:
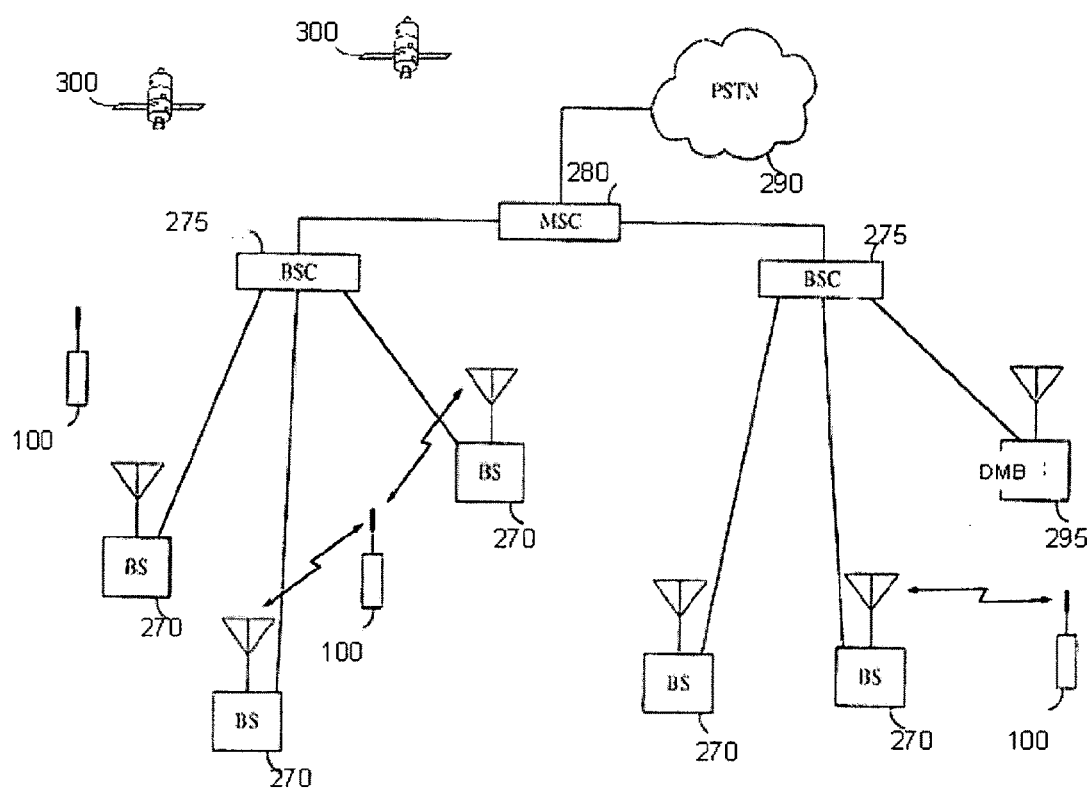
FIG. 12 is a block diagram of a CDMA wireless communication system operable with the mobile device of FIG. 11.

Referring now to FIG. 12, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable/mobile devices 100 operating within the system. The broadcast receiving module 111 (FIG. 11) of the portable device is typically configured to receive broadcast signals transmitted by the DMB transmitter 295. Similar arrangements may be implemented for other types of broadcast and multicast signaling (as discussed above).

FIG. 12 further depicts several global positioning system (GPS) satellites 300. Such satellites facilitate locating the position of some or all of the portable devices 100. Two satellites are depicted, but it is understood that useful positioning information may be obtained with greater or fewer satellites. The position-location module 115 (FIG. 11) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A method for controlling a user interface of a mobile device configured to support multiple tasks, the method comprising:
    detecting a lateral movement of the mobile device, the lateral movement being parallel to a display unit of the mobile device;
    seamlessly switching a displayed active task window according to the detected lateral movement of the mobile device, from a first active task window to a second active task window,
    wherein the second active task window corresponds to one active task window provided in a direction of the detected lateral movement of the mobile device, among one or more active task windows adjacent to the first active task window in a two-dimensional virtual arrangement having a plurality of virtually arranged active task windows, and
    wherein the two-dimensional virtual arrangement is maintained even though the direction of the detected lateral movement points to the vertical direction and even though the direction of the detected lateral movement points to the horizontal direction while switching the displayed active task window from the first active task window to the second active task window according to the detected lateral movement; and
    seamlessly switching the displayed active task window from the second active task window to the first active task window upon detecting another lateral movement whose direction is opposite to the detected lateral movement.

2. The method according to claim 1, further comprising:
    detecting a pitching gesture; and
    zooming in or out some or all of the plurality of virtually arranged active task windows according to the pitching gesture.

3. The method according to claim 1, further comprising:
    closing all of the plurality of virtually arranged active task windows in response to a certain movement of the mobile device as applied by a designated gesture of the user.

4. The method according to claim 3, wherein the designated gesture includes shaking the mobile device at least once.

5. A mobile device for controlling a user interface, the mobile device configured to support multiple tasks and comprising:
    a display unit;
    a detector configured to detect a lateral movement of the mobile device, the lateral movement being parallel to the display unit; and
    a controller, by controlling the display unit, configured to
        seamlessly switch a displayed active task window, according to the detected lateral movement of the mobile device from a first active task window to a second active task window,
        wherein the second active task window corresponds to one active task window provided in a direction of the detected lateral movement of the mobile device, among one or more active task windows adjacent to the first active task window in a two-dimensional virtual arrangement having a plurality of virtually arranged active task windows, and
        wherein the two-dimensional virtual arrangement is maintained even though the direction of the detected lateral movement points to the vertical direction and even though the direction of the detected lateral movement points to the horizontal direction while switching the displayed active task window from the first active task window to the second active task window according to the detected lateral movement,
        seamlessly switch the displayed active task window from the second active task window to the first active task window upon detecting another lateral movement whose direction is opposite to the detected lateral movement.

6. The method according to claim 1, further comprising:
    determining whether a gesture by the user for activating a gesturing mode of the mobile device is made,
    wherein the seamlessly switching of the displayed active task window comprises:
    seamlessly switching the displayed active task window to the different active task window according to the detected lateral movement of the mobile device when the mobile device is in the gesturing mode.

7. The mobile device according to claim 5,
    wherein the controller determines whether a gesture by the user for activating a gesturing mode of the mobile device is made, and seamlessly switches the displayed active task window to the different active task window according to the detected lateral movement of the mobile device when the mobile device is in the gesturing mode.

* * * * *